(12) United States Patent  
Urey

(10) Patent No.: US 10,602,128 B2  
(45) Date of Patent: Mar. 24, 2020

(54) MULTI-VIEW OCCLUSION-PREVENTIVE OPTICAL SYSTEM IN THE FORM OF A SCREEN COMBINED WITH AN IMAGE CAPTURING DEVICE

(71) Applicant: KOC Universitesi, Istanbul (TR)

(72) Inventor: Hakan Urey, Istanbul (TR)

(73) Assignee: Koc Universitesi, Istanbul (TR)

(*) Notice: Subject to any disclaimer, the term of this patent is extended or adjusted under 35 U.S.C. 154(b) by 0 days.

(21) Appl. No.: 15/780,759

(22) PCT Filed: Dec. 3, 2015

(86) PCT No.: PCT/TR2015/050226  
§ 371 (c)(1),  
(2) Date: Jun. 1, 2018

(87) PCT Pub. No.: WO2017/095340  
PCT Pub. Date: Jun. 8, 2017

(65) Prior Publication Data  
US 2019/0124321 A1 Apr. 25, 2019

(51) Int. Cl.  
*H04N 13/282* (2018.01)  
*G02B 3/08* (2006.01)  
*G02B 5/09* (2006.01)  
*H04N 13/111* (2018.01)  
*G06F 1/16* (2006.01)  
(Continued)

(52) U.S. Cl.  
CPC ............. *H04N 13/282* (2018.05); *G02B 3/08* (2013.01); *G02B 5/09* (2013.01); *G02B 27/0075* (2013.01); *G06F 1/1605* (2013.01); *H04N 5/33* (2013.01); *H04N 13/111* (2018.05); *H04N 13/232* (2018.05); *G09G 5/12* (2013.01)

(58) Field of Classification Search  
None  
See application file for complete search history.

(56) References Cited

U.S. PATENT DOCUMENTS 6,591,001 B1 * 7/2003 Oda .................. G06K 9/00597  
                                                            348/78  
2001/0010555 A1   8/2001 Driscoll, Jr.  
(Continued)

FOREIGN PATENT DOCUMENTS

EP              0 581 221 A1   2/1994  
WO    WO 2001/065861 A2   9/2001  
WO    WO 2011/025727 A1   3/2011

OTHER PUBLICATIONS

Yong, "The Design of MSC (Multi-Spectral Camera) System Operation" (Year: 2004).*

(Continued)

*Primary Examiner* — Eileen M Adams  
(74) *Attorney, Agent, or Firm* — Brinks Gilson & Lione

(57) ABSTRACT

A system in the form of a multi-view occlusion preventive optical system includes an image capturing device in cooperative operation with a passive screen. The system may be used as an image capturing device for wide angle panoramic imaging and occlusion prevention. The system may be a multi-view optical system that includes an image capturing device and a passive screen. The image capturing device may capture a plurality of images being reflected from the passive screen in optical communication therewith.

22 Claims, 6 Drawing Sheets

(51) Int. Cl.
*H04N 5/33* (2006.01)
*G02B 27/00* (2006.01)
*H04N 13/232* (2018.01)
*G09G 5/12* (2006.01)

(56) References Cited

U.S. PATENT DOCUMENTS

| | | | |
|---|---|---|---|
| 2003/0108198 A1* | 6/2003 | Lahiri | G06F 21/84 |
| | | | 380/54 |
| 2003/0156187 A1 | 8/2003 | Gluckman et al. | |
| 2012/0127128 A1* | 5/2012 | Large | G06F 3/0425 |
| | | | 345/175 |
| 2013/0021460 A1* | 1/2013 | Burdoucci | A45D 44/005 |
| | | | 348/77 |
| 2013/0038696 A1 | 2/2013 | Ding et al. | |
| 2014/0218615 A1* | 8/2014 | Williams, IV | H04N 5/28 |
| | | | 348/722 |
| 2015/0138303 A1* | 5/2015 | White | H04N 7/144 |
| | | | 348/14.07 |

OTHER PUBLICATIONS

International Search Report and Written Opinion, dated Aug. 2, 2016, pp. 1-8, issued in International Application No. PCT/TR2015/050226, European Patent Office, Rijswijk, The Netherlands.
International Preliminary Report on Patentability, dated Mar. 22, 2018, pp. 1-17, issued in International Application No. PCT/TR2015/050226, European Patent Office, Munich, Germany.

* cited by examiner

MULTI-VIEW OCCLUSION-PREVENTIVE OPTICAL SYSTEM IN THE FORM OF A SCREEN COMBINED WITH AN IMAGE CAPTURING DEVICE

RELATED APPLICATIONS

The present patent document is a 371 continuation of PCT Application Serial No. PCT/TR2015/050226, filed Dec. 3, 2015, designating the United States and published in English, which is hereby incorporated by reference.

TECHNICAL FIELD

The present disclosure relates to a system in the form of a multi-view occlusion preventive optical system having an image capturing device in cooperation with a passive screen. The system is intended to be used as an image capturing device for wide angle panoramic imaging and occlusion prevention.

BACKGROUND

The concept of multi-view imaging is known per se in the technical field. Head-mounted camera systems interacting with the physical environment in the sense that different views of the environment are rendered is an explored area of study. For instance combination of a multitude of singular views of a real-time scene, so as to be processed by a processing unit and by which an image of the scene with enhanced visual properties is obtainable, is a well-described technique.

SUMMARY

It is to be noted, however, that capturing a plurality of images of a scene by which multi-perspective imaging can be performed to allow wide angle panoramic imaging at the same time preventing occlusions is not a problem defined in the field. In a more specific manner, multi-view imaging can be advantageously used to improve security in different environments such as supermarkets, artwork exhibitions, museums, work environment etc.

On the other hand, computer users are allowed to interact in a more realistic manner while using telepresence applications. More particularly, as a basic example, capturing images of the computer users with direct eye contact is not possible as the camera is located outside the display area of the computer. To this end, more sophisticated telepresence or teleconferencing systems use multiple cameras and interpolate the views. Reconstructing 3D views of the user and his environment requires an array of cameras and more sophisticated installments. The latter approach is a very render intensive approach. Array of cameras require complex hardware, fixed installations, and substantial post-detection processing to handle the large sets of data from scans of each camera to register and create arbitrary viewing positions.

One of the prior art publications in the technical field may be referred to as US 20130038696, which teaches the ray modeling of multi-view/light-field imaging with single camera and curved mirror array. More particularly, US 20130038696 discloses a system in which a catadioptric camera creates images from a 3D scene by creating ray images defined as 2D arrays of ray-structure picture-elements (ray-xels). Each ray-xel captures light intensity, mirror-reflection location, and mirror-incident light ray direction. A 3D image is then rendered from the ray images by combining the corresponding ray-xels.

The catadioptric camera system of US 20130038696 involves a multiplicity of curved mirrors arranged into a mirror array for reflecting a desired 3D scene and a digital imaging system capturing ray images of said curved mirrors, each of said ray images being a two-dimensional array of ray-structure picture-elements (ray-xels). US 20130038696 provides that each respective ray-xel includes a light intensity measure according to a predefined color model, mirror-reflection location coordinates, and mirror-incident ray direction coordinates.

Another prior art publication in the technical field may be referred to as US 2003156187, which discloses catadioptric sensors using one or more planar mirrors to produce rectified stereoscopic images using only one image detector. By combining multiple views using the mirrors, a composite stereo image that is rectified is formed. The document also teaches different configurations of mirrors to generate virtual camera viewpoints.

A further prior art publication in the technical field is US 2001010555, disclosing a panoramic camera apparatus in the form of a catadioptric camera for wide angle imaging, capturing a 360 degree panoramic image. The document describes use of a single camera with spherical or parabolic mirrors.

The present occlusion-preventive multi-view imaging system, on the other hand, proposes a passive screen effective in performing multi-view image capturing function. Image capturing function is effected using reflections off the screen of said passive screen. The system ensures that the ambient scene is captured using the reflections from the screen by means of a camera in the manner that occlusions are prevented.

Prevention of occlusions advantageously provides improved security functions in cases where potentially unlawful attempts can be better captured by way of capturing multi-view images of the scene. For instance, a non-authorized person who unlawfully attempts to break open a door in a building can be better identified thanks to the occlusion preventive imaging system by which the face and other personal details such as clothing or any distinguishing features of an intruder can be easily identified. This is primarily due to the fact that such an intruder is likely to position himself with respect to security cameras so as to avoid direct detection.

In another scenario, a computer user committing a cybercrime in a working environment will not be detected as long as his hands or the computer screen is not directly captured. However, the occlusion-preventive multi-view imaging system is much more likely to provide more detailed information in relation to a certain scene where a person commits an unauthorized or an unlawful act.

Additionally, in a telepresence system, in contrast to existing solutions embodying use of one or multiple cameras facing the viewer, the occlusion-preventive multi-view imaging system affords a multi-view image capture system by which the user himself constitutes the direct object of the scene.

An aspect of the occlusion-preventive multi-view imaging system is to provide a multi-view image capture system combined with an image capturing screen.

Another aspect of the occlusion-preventive multi-view imaging system is to provide a wall-mountable image capturing screen reflecting a multi-view image of a scene and optically cooperating with an image capturing device.

A further aspect of the occlusion-preventive multi-view imaging system is to provide a telepresence system having a multi-view image capturing screen in optical communication with an image capturing device.

A still further aspect of the occlusion-preventive multi-view imaging system is to provide a passive image capturing screen.

A yet still further aspect of the occlusion-preventive multi-view imaging system is to provide an occlusion-preventive passive image capturing screen.

A yet still further object of the aspect of the occlusion-preventive multi-view imaging system is to provide an occlusion-preventive and undetected passive image capturing screen.

BRIEF DESCRIPTION OF THE FIGURES

Accompanying drawings are given solely for the purpose of exemplifying a multi-view imaging system, whose advantages over prior art were outlined above and will be explained in brief hereinafter.

The drawings are not meant to delimit the scope of protection as identified in the claims nor should they be referred to alone in an effort to interpret the scope without recourse to the technical disclosure in the herein.

DETAILED DESCRIPTION

Figure 1:
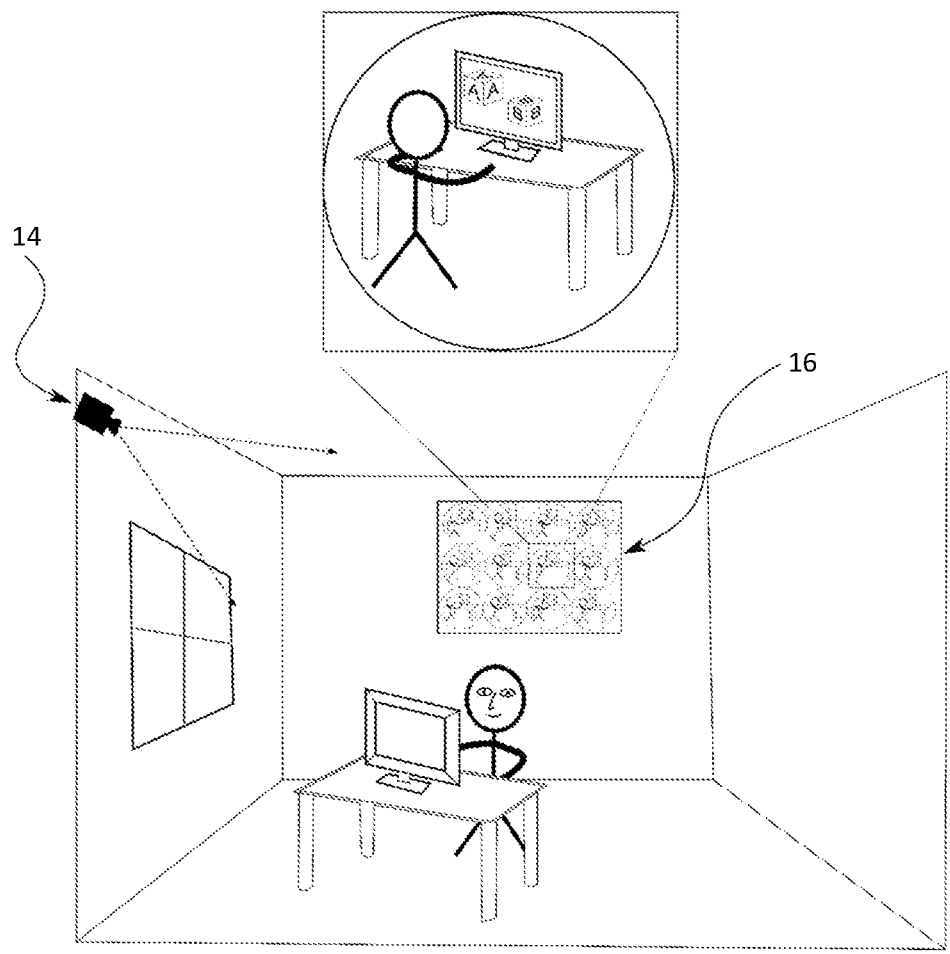
FIG. 1 demonstrates operation of an occlusion-preventive multi-view imaging system with a passive screen having an image capturing construct.

The following numerals are referred to herein:
11) Passive screen
12) Optical element
13) Passive screen substrate
14) Image capturing device
15) Optical element array
16) Wall-mountable assembly
17) Filtering layer
18) Computer
19) Computer camera
20) Computer screen
21) Computer screen display area
22) Computer screen imaging area According to an embodiment of the occlusion-preventive multi-view imaging system, an image capturing device (14) is proposed, the image capturing device (14) in the form of a single high-resolution camera optically communicating with a passive screen (11) having an image capturing construct with a plurality of optical elements (12) optionally in the form of reflective, refractive or diffractive elements and particularly in the form of reflective elements.

The optical elements (12) to be of use in the form of an optical element array (15) may for instance include reflective, refractive lens arrays, mirror elements or diffractive Fresnel lens arrays, such optical elements (12) making up a generally two-dimensional web as will be delineated hereinafter. Therefore, the optical communication between the passive screen (11) and the image capturing device (14) should be construed such that a multi-perspective view image of a scene is preferably reflected by the passive screen's (11) image capturing construct and captured by the image capturing device (14). In other words, image capturing is effectuated by the high-resolution camera and the passive screen (11) assumes the role of providing the multi-perspective view image of the scene.

The passive screen's (11) image capturing construct can comprise optical elements (12) typically in the form of lens elements, mirror elements or diffractive Fresnel lenses. The passive screen (11) may involve a dioptric or catadioptric configuration. In the dioptric configuration, optical elements (12) in the form of lens elements are separated in discrete steps by a distance equal to or less than the interpupillary distance (IPD). In the case of a catadioptric configuration, optical elements (12) in the form of mirror elements are also separated in discrete steps by a distance equal to or less than the interpupillary distance (IPD). It is to be noted that optical elements (12) can be configured to provide full-parallax or horizontal-parallax-only image capturing, in which cases respectively, optical elements (12), for instance mirror elements or lens elements capture perspective images in horizontal and vertical directions or in the horizontal direction. In the case of horizontal-parallax-only configuration, the optical elements (12) are typically structured to extend longitudinally along the vertical axis so as to be neighboring each other on the horizontal direction.

According to the occlusion-preventive multi-view imaging system, the passive screen's (11) image capturing construct can be provided with an array of optical elements (12) preferably consisting of individual reflective elements altogether functioning as a multi-perspective reflection medium for a scene-near screen.

According to an alternative embodiment of the occlusion-preventive multi-view imaging system, the passive screen's (11) image capturing construct can be provided with an array of optical elements (12) in the form of a micro-element array disposed in a denser configuration also effective in multi-perspective image capturing and according to which neighboring micro-elements are separated in discrete steps by approximately 1 mm. Optical elements (12) as micro-elements (micro-element array) also allow dioptric or catadioptric configurations with full-parallax or horizontal-parallax-only imaging options.

The optical elements (12) of the image capturing construct in the passive screen (11) are placeable on a passive screen substrate (13). This array base can be a parabolic base to bring optical axes of the lens elements facing parallel towards to the scene being reflected in a parabolic screen and parallel field of view configuration. Alternatively, a flat passive screen substrate (13) will provide a flat screen and diverging field of view configuration in the same manner a spherical concave passive screen substrate (13) will provide converging field of view allowing toe-in image capturing.

According to an embodiment of the occlusion-preventive multi-view imaging system, the optical elements (12) of the image capturing construct in the passive screen (11) can be a reflective Fresnel lens array, which can be made flexible using polymeric materials.

The optical elements (12) preferably have different optical axes. The optical axes of the optical elements (12) are more preferably tilted towards the image capturing device (14) with specified focal lengths and optical powers.

The optical interaction of the image capturing device (14), i.e. the high-resolution camera, with the passive screen (11) having the image capturing construct can be realized in different positionment setups of the camera relative to the passive screen (11). In one embodiment, the passive screen (11) can be a hand-held medium while the image capturing device (14) is incorporated into a head-mountable device. The head-mountable device therefore comprising the image capturing device (14) allows that the image capturing device (14) can optically communicate with the passive screen (11) with relative positionment with respect to each other and can thereby capture reflected images of the scene through the image capturing construct while the user wearing the head-mountable device remains the main object of the scene.

The same analogy is equally applicable to a computer (18) with a computer camera (19) as the image capturing device (14), in which configuration a layer of optical element array (15) as the image capturing construct is stacked in between conventional LCD screen layers and the computer camera (19) captures multi-perspective images so as to ensure user eye contact during telepresence sessions. As the off-axis computer camera (19) is disposed at a certain angle with respect to the computer screen (20), the user is allowed to interact in a more realistic manner while using telepresence applications. In the exemplary embodiment of FIG. 3, the computer camera (19) will preserve its off-axis orientation irrespective of the angle of the computer screen (20) with respect to the laptop's keyboard plane. The computer camera (19) can be a removable unit facing the computer screen (20) in any other off-axis configuration so as to generate a view of the user directly looking into the eyes of another user during telepresence sessions.

Figure 3:
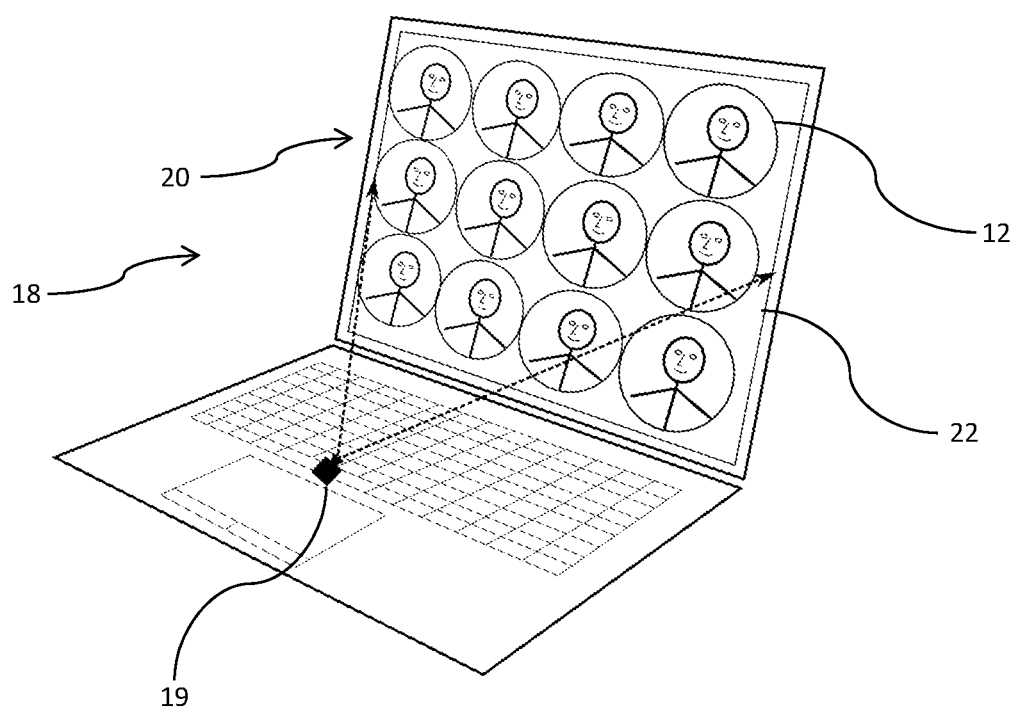
FIG. 3 demonstrates an exemplary view of a computer having an image capturing construct cooperating with a computer camera.

According to the embodiment as shown in FIG. 3, back light of a typical LCD screen is time synchronized with camera trigger to allow simultaneous display and capture. To this end, for each frame of camera, the backlight goes off for fraction of time (for instance few milliseconds) and during that time, camera captures the visible perspective reflections of viewer through screen. In that way, viewer is displayed with content on screen and the camera captures viewer reflections without crosstalk.

Figure 4:
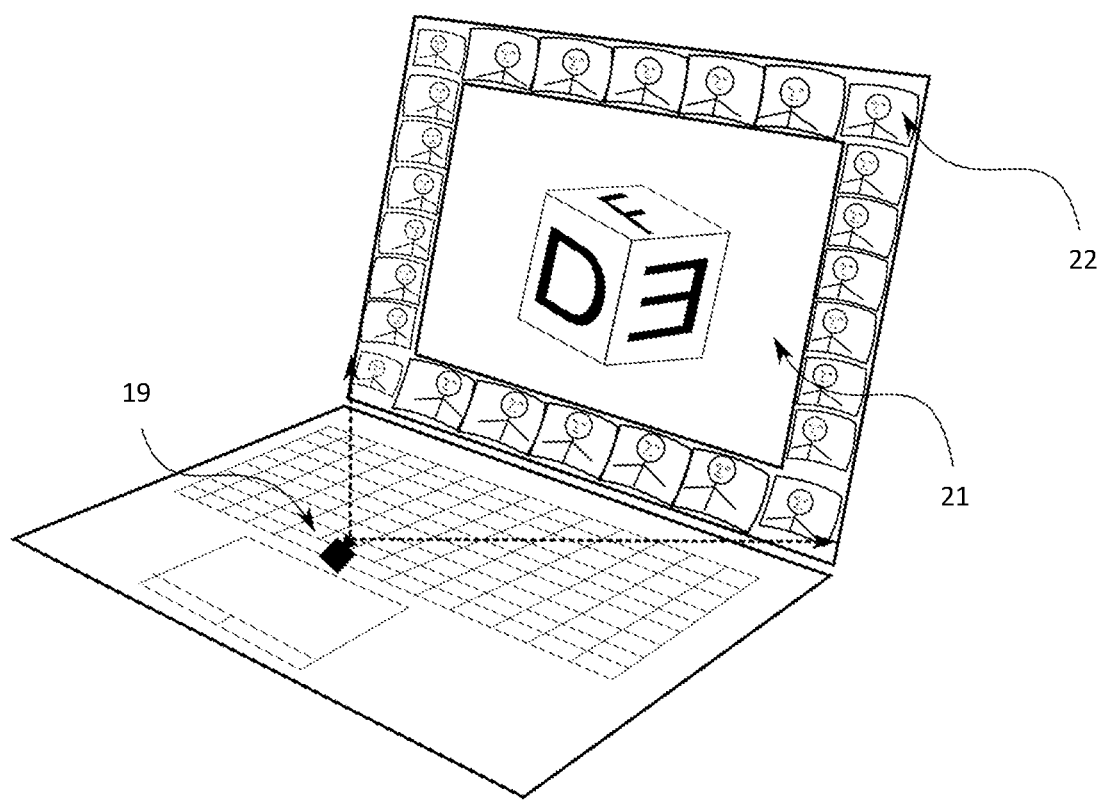
FIG. 4 demonstrates a schematic view of the computer having the image capturing construct cooperating with the computer camera where optical elements of the image capturing construct are disposed on the frame of the computer screen.
Figure 5:
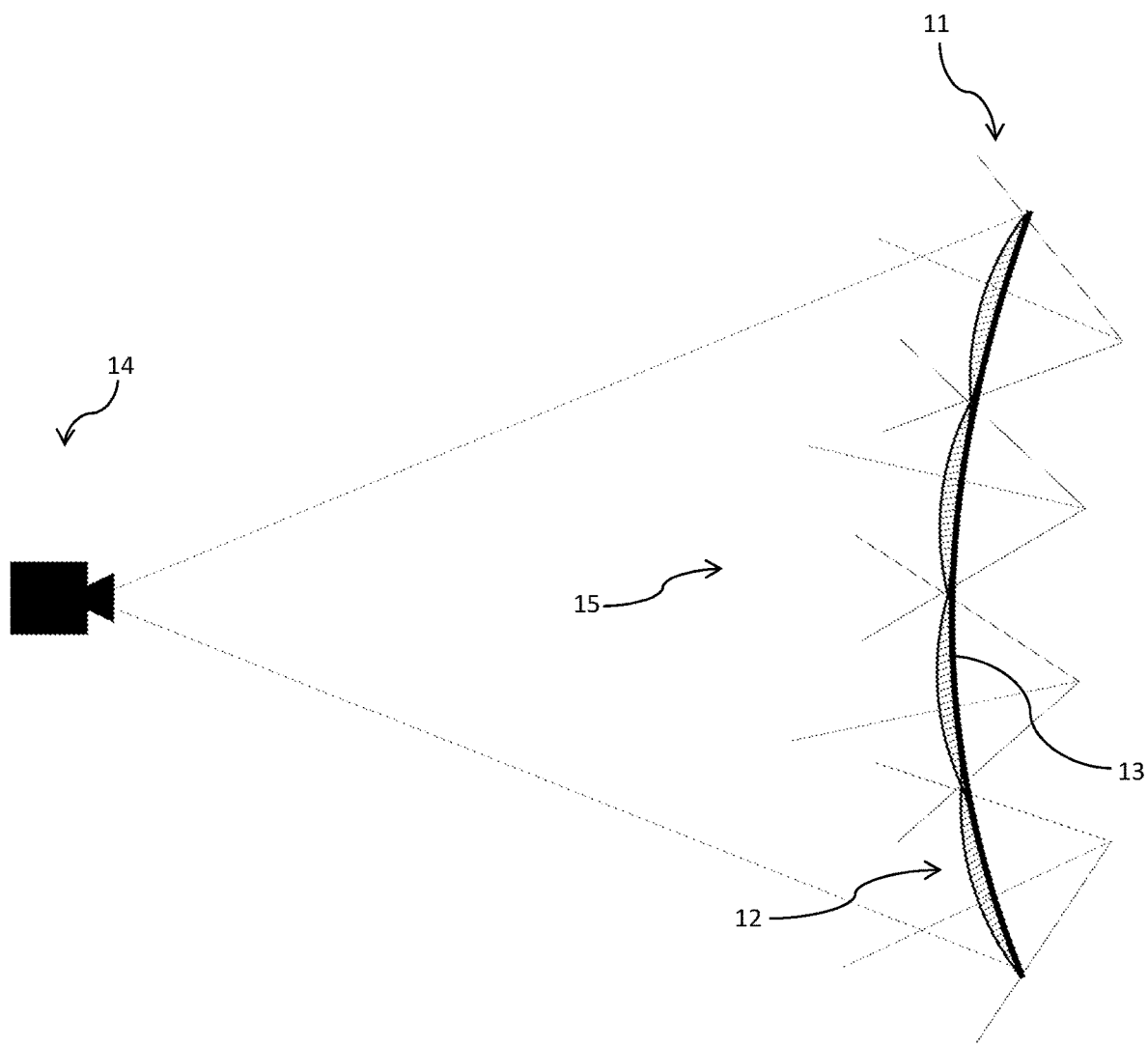
FIG. 5 demonstrates a schematic view of a passive screen configuration optically communicating with an image capturing device where a convex substrate, reflective lenses and elemental FOV are shown and where the reflective lens array placed on spherical convex substrate is used to achieve diverging field of view for wide angle and panoramic imaging.
Figure 6:
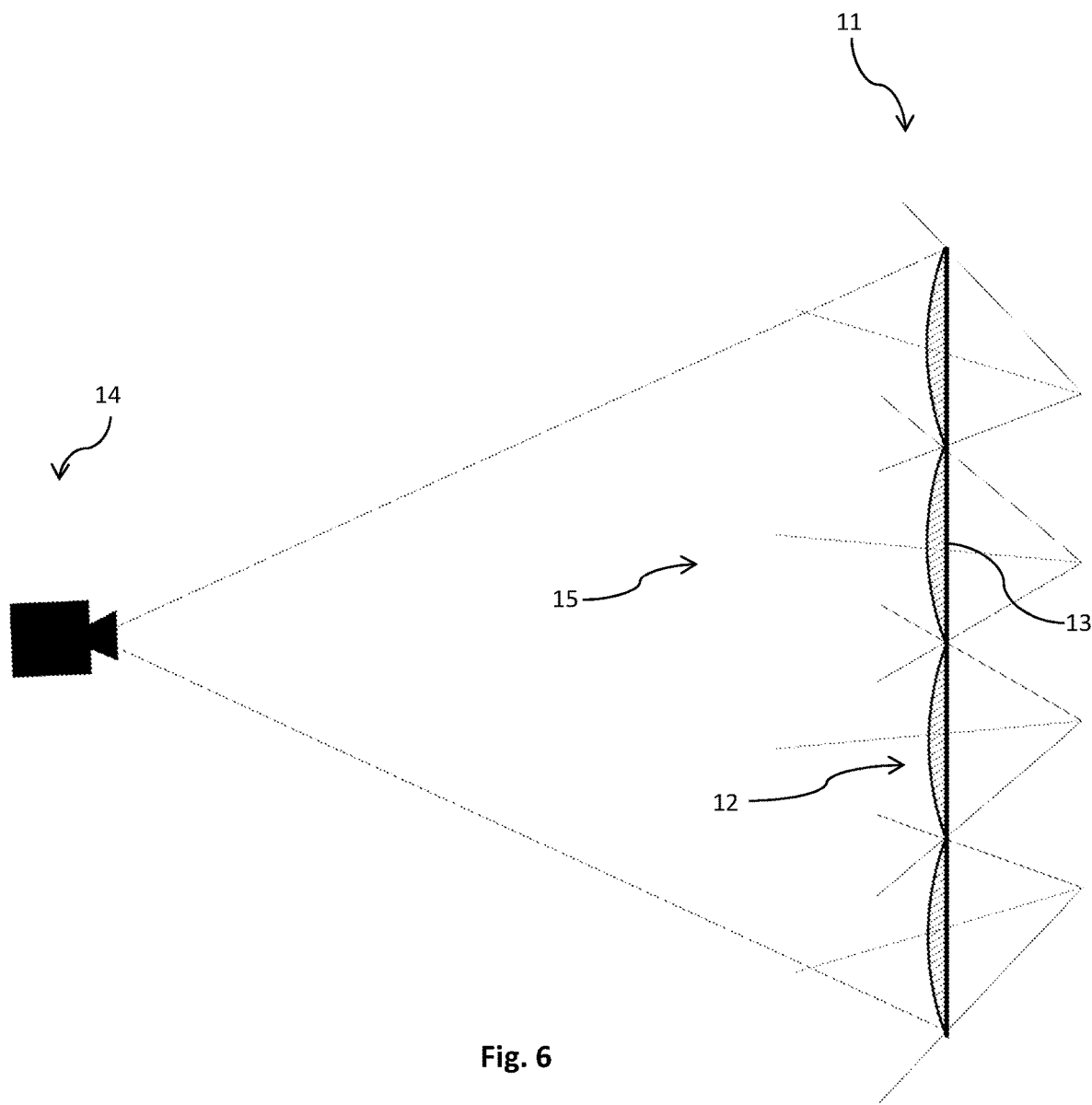
FIG. 6 demonstrates a schematic view of a passive screen configuration optically communicating with an image capturing device where a flat substrate, reflective lenses and elemental FOV are shown and where the reflective lens array placed on flat substrate is used to achieve slightly diverging field of view for wide angle and panoramic imaging.

Alternatively, as seen in FIG. 4, the optical elements (12) can be disposed on or adjacent to the frame of the computer screen (20). The computer camera (19) therefore only utilizes a subset of the optical elements (12) in this case to obtain different perspective views. Therefore, a computer screen display area (21) and a computer screen imaging area (22) are created. The optical elements (12) can be convex mirrors or Fresnel lenses around the LCD panel.

Said image capturing device (14) can capture perspective views of the scene through reflections of the passive screen (11) as a handheld screen. Alternatively, the passive screen (11) can be used as a wall-mountable plate-like assembly having an optical element array (15) as the image capturing construct in optical cooperation or communication with the image capturing device (14). The image capturing device (14) as a fixed position device may for instance capture reflections from a plurality of wall-mountable assemblies (16) secured to different walls of the same room. Alternatively, the image capturing device (14) can be a table-top device, a corner mount security camera (FIG. 1) or a centrally suspended or disposed 3-D system with multiple cameras.

Therefore, the operatively coupled image capturing device (14) and the passive screen (11) having the image capturing construct provides multi-perspective capturing of a scene irrespective of whether the image capturing device (14) is within a head-mountable device or is a fixed position device. On the other hand, use of a head-mountable device advantageously affords capturing of multi-view images of a scene in which the user himself constitutes the direct object therein and making use of image processing algorithms to synthesize stereo views, the scene can be dynamically reconstructed as a sequence of reconstructed images and transferred to a portable image display terminal such as a smartphone or any other image display device, for instance during telepresence sessions.

Figure 2:
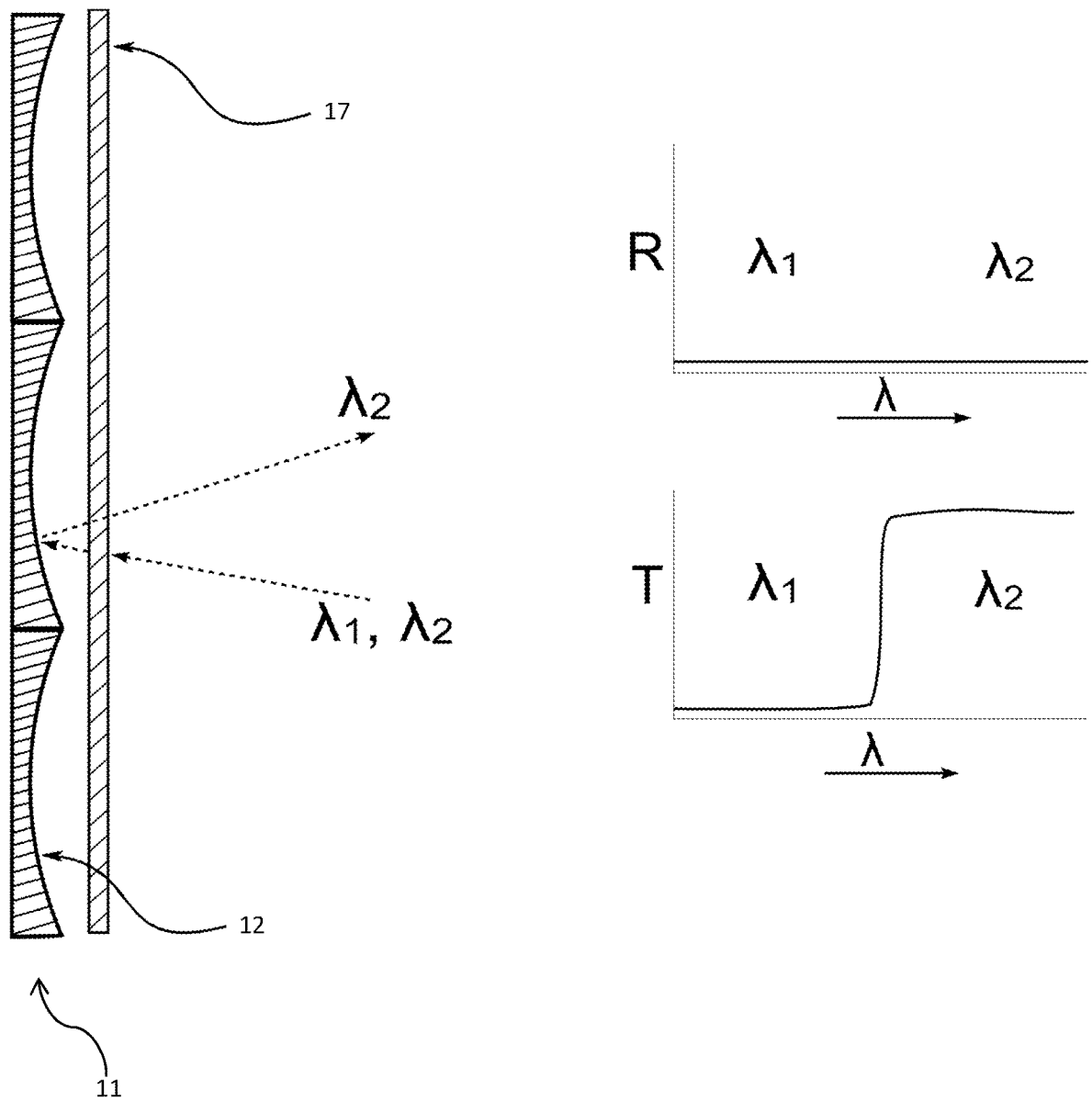
FIG. 2 demonstrates an exemplary view of a passive screen with a near-IR pass filter.

According to an alternative embodiment of the occlusion-preventive multi-view imaging system, an additional layer in the form of a filtering layer (17) can be applied on top of the wall-mountable assembly's (16) optical element array (15) to block/absorb visible light and transmit IR light only and a near-IR camera is used to capture IR reflections through the optical element array (15). FIG. 2 demonstrates a configuration in which visible light with the wavelength $\lambda_1$ is blocked and near-IR light with the wavelength $\lambda_2$ is transmitted to be captured by the image capturing device (14) in the form of a near-IR camera. Therefore, an unnoticeable or more unobtrusive security application is provided to improve security applications.

In a nutshell, the occlusion-preventive multi-view imaging system proposes a multi-view optical system comprising an image capturing device (14) and a passive screen (11), said image capturing device (14) capturing a plurality of images being reflected from said passive screen (11) in optical communication therewith.

In one embodiment of the occlusion-preventive multi-view imaging system, said image capturing device (14) is in optical communication with said passive screen (11) in the manner that an image capturing construct of said passive screen (11) has a plurality of individual optical elements (12) constituting a two-dimensional optical element array (15) that reflects a plurality of different views of a scene on one side thereof facing said image capturing device (14), each different view of the scene being reflected by a respective optical element (12) and said image capturing device (14) simultaneously capturing a plurality of different views of the scene as individually reflected by the optical elements (12).

In a further embodiment of the occlusion-preventive multi-view imaging system, said image capturing device (14) comprises at least one camera.

In a further embodiment of the occlusion-preventive multi-view imaging system, said optical elements (12) of the image capturing construct are reflective, refractive, diffractive elements or a combination thereof.

In a further embodiment of the occlusion-preventive multi-view imaging system, said optical elements (12) of the image capturing construct are reflective or refractive lens elements, mirror elements or Fresnel lenses.

In a further embodiment of the occlusion-preventive multi-view imaging system, said optical elements (12) of the image capturing construct are lens elements or mirror elements separated in discrete steps by a distance equal to or less than an average interpupillary distance (IPD) value.

In a further embodiment of the occlusion-preventive multi-view imaging system, said optical elements (12) of the image capturing construct are configured to provide full-parallax or horizontal-parallax-only views.

In a further embodiment of the occlusion-preventive multi-view imaging system, said optical elements (12) of the image capturing construct are configured to provide horizontal-parallax-only reflections such that they are structured to extend longitudinally along a first direction and so as to be neighboring each other on a second direction perpendicular to the first direction.

In a further embodiment of the occlusion-preventive multi-view imaging system, the passive screen's (11) image capturing construct is provided with an array of optical elements (12) in the form of an optical element array (15) disposed such that neighboring optical elements (12) are separated in discrete steps by approximately 4 to 75 mm.

In a further embodiment of the occlusion-preventive multi-view imaging system, the passive screen's (11) image capturing construct is provided with an array of optical elements (12) in the form of a micro-element array disposed in a substantially dense configuration such that neighboring micro-elements are separated in discrete steps by approximately 0.5 to 4 mm.

In a further embodiment of the occlusion-preventive multi-view imaging system, said optical elements (12) of the image capturing construct are placeable on a passive screen substrate (13).

In a further embodiment of the occlusion-preventive multi-view imaging system, said passive screen substrate (13) is a non-planar base.

In a further embodiment of the occlusion-preventive multi-view imaging system, said passive screen substrate (13) is a flat base as a flat screen and diverging field of view configuration.

In a further embodiment of the occlusion-preventive multi-view imaging system, said passive screen substrate (13) is a spherical convex base to provide wide angle image capture.

In a further embodiment of the occlusion-preventive multi-view imaging system, the optical elements (12) of the image capturing construct are placeable on a flexible passive screen substrate (13).

In a further embodiment of the occlusion-preventive multi-view imaging system, the optical elements (12) placeable on a flexible passive screen substrate (13) are Fresnel lenses.

In a further embodiment of the occlusion-preventive multi-view imaging system, the optical elements (12) have different optical axes tilted towards the image capturing device (14) with specified focal lengths and optical powers.

In a further embodiment of the occlusion-preventive multi-view imaging system, the optical elements (12) have different optical axes tilted away from the image capturing device (14) with specified optical power.

In a further embodiment of the occlusion-preventive multi-view imaging system, the passive screen (11) is a portable medium.

In a further embodiment of the occlusion-preventive multi-view imaging system, the image capturing device (14) is incorporated into a head-mountable device.

In a further embodiment of the occlusion-preventive multi-view imaging system, the passive screen (11) is a wall-mountable assembly (16) in optical communication with a position-adjustable image capturing device (14).

In a further embodiment of the occlusion-preventive multi-view imaging system, the position-adjustable image capturing device (14) is a table-top device, a ground-standing device, a corner mount security camera or a centrally suspended or disposed 3-D camera.

In a further embodiment of the occlusion-preventive multi-view imaging system, the multi-view optical system comprises one position-adjustable image capturing device (14) and a plurality of wall-mountable assemblies (16) secured to different wall portions of a single room.

In a further embodiment of the occlusion-preventive multi-view imaging system, a passive screen (11) having an image capturing construct with a plurality of individual optical elements (12) forming a two-dimensional optical element array (15) is proposed, said image capturing construct reflecting a plurality of different views of a scene on one side thereof facing an image capturing device (14), said passive screen (11) being stacked in between layers of a computer screen (20) of a computer (18).

In a further embodiment of the occlusion-preventive multi-view imaging system, a computer (18) comprising a computer screen (20) with a passive screen (11) is proposed.

In a further embodiment of the occlusion-preventive multi-view imaging system, the image capturing device (14) in the form of a computer camera (19) is an embedded or removable unit of the computer (18).

In a further embodiment of the occlusion-preventive multi-view imaging system, the image capturing device (14) in the form of a computer camera (19) is in wired or wireless signal communication with the computer (18).

In a further embodiment of the occlusion-preventive multi-view imaging system, the computer camera (19) is an off-axis camera disposed at a certain angle with respect to the computer screen (20).

In a further embodiment of the occlusion-preventive multi-view imaging system, the computer (18) is a laptop computer and the off-axis computer camera (19) is disposed at a certain angle with respect to the computer screen (20).

In a further embodiment of the occlusion-preventive multi-view imaging system, the off-axis computer camera (19) is disposed on the laptop's keyboard plane.

In a further embodiment of the occlusion-preventive multi-view imaging system, backlight of the computer screen (20) is time synchronized with the computer camera (19) trigger to allow simultaneous display and capture.

In a further embodiment of the occlusion-preventive multi-view imaging system, for each frame of the computer camera (19), the backlight of the computer screen (20) goes off for fraction of time during which said computer camera (19) captures the visible perspective reflections of viewer through screen.

In a further embodiment of the occlusion-preventive multi-view imaging system, optical elements (12) are disposed on the frame of the computer screen (20) whereby the computer camera (19) utilizes the optical elements (12) on the frame to obtain different perspective views.

In a further embodiment of the occlusion-preventive multi-view imaging system, the optical elements (12) are convex mirrors or Fresnel lenses around the computer screen (20).

In a further embodiment of the occlusion-preventive multi-view imaging system, the wall-mountable assemblies (16) comprises an additional layer in the form of a filtering layer (17) applied on top of the optical element array (15) to block or absorb visible light and transmit infrared light.

In a further embodiment of the occlusion-preventive multi-view imaging system, the image capturing device (14)

is a near-Infrared camera to capture IR reflections through said optical element array (15).

In a further embodiment of the occlusion-preventive multi-view imaging system, the image capturing device (14) comprises an image processing unit synthesizing different views being obtained to dynamically reconstruct the scene as a sequence of reconstructed images using image processing algorithms.

The invention claimed is:

1. A multi-view optical system comprising:
an image capturing device and a passive screen, said image capturing device configured to capture a plurality of images being reflected from said passive screen;
wherein said image capturing device is in optical communication with said passive screen in a manner that an image capturing construct of said passive screen includes a plurality of individual optical elements constituting a two-dimensional optical element array that reflects a plurality of different views of a scene on one side thereof facing said image capturing device, each different view of the scene being reflected by a respective optical element and said image capturing device configured to simultaneously capture the plurality of different views of the scene as individually reflected by the optical elements,
wherein said optical elements have different optical axes,
said optical elements on the passive screen are arranged on a flexible substrate of the passive screen, said optical elements have different optical axes tilted towards the image capturing device with specified focal lengths and optical powers or,
said optical elements have different optical axes tilted away from the image capturing system with specified optical power.

2. The multi-view optical system as set forth in claim 1, wherein said optical elements of the image capturing construct are lens elements comprising reflective lens elements or refractive lens elements, mirror elements, Fresnel lenses, or a combination thereof.

3. The multi-view optical system as set forth in claim 2, wherein said optical elements of the image capturing construct include the lens elements or the mirror elements separated in discrete steps by a distance equal to or less than an average interpupillary distance (IPD) value.

4. The multi-view optical system as set forth in claim 1, wherein the optical elements are arranged in the optical element array such that neighboring optical elements are separated in discrete steps by approximately 4 to 75 mm.

5. The multi-view optical system as set forth in claim 1 wherein the optical elements constituting the two-dimensional optical element array are micro elements arranged in a micro-element array disposed in a substantially dense configuration such that neighboring micro-elements are separated in discrete steps by approximately 0.5 to 4 mm.

6. The multi-view optical system as set forth in claim 1, wherein said flexible substrate is a non-planar base.

7. The multi-view optical system as set forth in claim 1, wherein the flexible substrate is a flat base, the flat base being a flat screen providing a diverging field of view configuration of the optical elements.

8. The multi-view optical system as set forth in claim 1, wherein said flexible substrate is a spherical convex base to provide wide angle image capture.

9. The multi-view optical system as set forth in claim 1, wherein the optical elements arranged on the flexible substrate are Fresnel lenses.

10. The multi-view optical system as set forth in claim 1, wherein the image capturing device is incorporated into a head-mountable device.

11. The multi-view optical system as set forth in claim 1, wherein the passive screen is a portable wall-mountable assembly in optical communication with a position-adjustable image capturing device.

12. The multi-view optical system as set forth in claim 11, wherein the position-adjustable image capturing device is a table-top device, a ground-standing device, a corner mount security camera or a centrally suspended or disposed 3-D camera.

13. The multi-view optical system as set forth in claim 12, wherein the position-adjustable image capturing device is only one position-adjustable image capturing device and the portable wall-mountable assembly comprises a plurality of wall-mountable assemblies securable to different wall portions of a single room.

14. A multi-view optical system comprising:
a passive screen having an image capturing construct comprising a plurality of individual optical elements forming a two-dimensional optical element array, said image capturing construct reflecting a plurality of different views of a scene on one side thereof facing an image capturing device, said passive screen being stacked in between layers of a computer screen of a computer.

15. The multi-view optical system of claim 14, wherein the computer is a laptop computer that includes a computer camera, the computer camera comprising an off-axis computer camera disposed on a keyboard plane of the laptop computer.

16. The multi-view optical system of claim 14, wherein a backlight of the computer screen is configured for time synchronization with an activation trigger of the computer camera to allow simultaneous display and capture.

17. The multi-view optical system as set forth in claim 16, wherein for each frame of the computer camera, the backlight of the computer screen is configured to go off for a period of time during which said computer camera is activated to capture visible perspective reflections of a viewer through the computer screen.

18. The multi-view optical system as set forth in claim 14, wherein the optical elements are disposed on a frame of the computer screen and the computer camera utilizes the optical elements on the frame to obtain different perspective views.

19. A multi-view optical system comprising:
a passive screen having an image capturing construct comprising a plurality of individual optical elements forming a two-dimensional optical element array, said image capturing construct reflecting a plurality of different views of a scene on one side thereof facing an image capturing device, said passive screen being stacked in between layers of a computer screen of a computer, wherein the passive screen includes a plurality of wall-mountable assemblies and the wall-mountable assemblies comprise an additional layer, the additional layer being a filtering layer applied on top of the optical element array and configured to block or absorb visible light and transmit infrared light.

20. The multi-view optical system as set forth in claim 19, wherein the image capturing device comprises a near-infrared camera to capture infrared radiation (IR) reflections through said optical element array.

21. The multi-view optical system as set forth in claim 14 wherein the passive screen with the image capturing construct is positioned behind an outermost layer of the layers of the computer screen of the computer and in front of a back light of the computer screen.

22. The multi-view optical system as set forth in claim 14 wherein the plurality of different views of the scene are reflected on the one side of the image capturing construct by the plurality of individual optical elements forming the two-dimensional optical element array.

\* \* \* \* \*